United States Patent
Saito et al.

(10) Patent No.: US 9,571,801 B2
(45) Date of Patent: Feb. 14, 2017

(54) PHOTOGRAPHING PLAN CREATION DEVICE AND PROGRAM AND METHOD FOR THE SAME

(71) Applicant: Hitachi, Ltd., Tokyo (JP)

(72) Inventors: Kojiro Saito, Tokyo (JP); Yasutaka Kuramoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 14/192,256

(22) Filed: Feb. 27, 2014

(65) Prior Publication Data
US 2015/0009326 A1   Jan. 8, 2015

(30) Foreign Application Priority Data
Jul. 5, 2013   (JP) .................................. 2013-141525

(51) Int. Cl.
H04N 7/18   (2006.01)
G01C 11/02   (2006.01)

(52) U.S. Cl.
CPC .............. *H04N 7/181* (2013.01); *G01C 11/02* (2013.01)

(58) Field of Classification Search
IPC .................................................... G01C 23/005
See application file for complete search history.

(56) References Cited

U.S. PATENT DOCUMENTS

| 6,249,603 | B1 * | 6/2001 | Rucklidge | G06K 9/6203 345/690 |
| 2005/0175253 | A1 * | 8/2005 | Li | G06K 9/0063 382/260 |
| 2009/0132103 | A1 * | 5/2009 | Marty | G01C 21/00 701/3 |
| 2009/0256741 | A1 * | 10/2009 | Shibayama | G01S 13/90 342/352 |

FOREIGN PATENT DOCUMENTS

| JP | 2005-241455 A | 9/2005 |
| JP | 2010-061216 A | 3/2010 |
| JP | 5137123 B2 * | 2/2013 |

* cited by examiner

*Primary Examiner* — Tracy Y Li
(74) *Attorney, Agent, or Firm* — Foley & Lardner LLP (57) ABSTRACT

The present invention provides a device for creating a photographing plan by extracting a changed point from target points to preferentially photograph the extracted point. The photographing plan creation device includes: a photographed data reception part for receiving a first photographed data photographed by a flying object; a change determination part for comparing the first photographed data to a second photographed data which is the past photographed data stored in an image data storage part; a priority setting part for setting the shooting priority based on the comparison result; a photographing possibility determination part for determining whether photography is possible at the observation time; a photographing plan creation part for creating a photographing plan based on the shooting priority and the photographing possibility determination; and a (Continued)

shooting command transmission part for converting the photographing plan to a command and transmitting the command to the flaying object.

20 Claims, 13 Drawing Sheets

| CHANGE DETERMINATION THRESHOLD | |
|---|---|
| CHANGE DETERMINATION | THRESHOLD |
| CHANGE PRESENT | NEW IMAGE STATISTICS ≥ AVERAGE STATISTICS FOR PAST 3 PERIODS + 10 |
| CHANGE NOT PRESENT | NEW IMAGE STATISTICS < AVERAGE STATISTICS FOR PAST 3 PERIODS + 10 |

| CHANGE DETERMINATION PROCESSING RESULT | |
|---|---|
| OBSERVED OBJECT | CHANGE DETERMINATION |
| PONTOON DOCK A | CHANGE PRESENT |
| PONTOON DOCK B | CHANGE NOT PRESENT |
| PONTOON DOCK C | CHANGE PRESENT |

FIG. 8C

| PRIORITY UPDATE BASED ON CHANGE DETERMINATION | |
|---|---|
| OBSERVED OBJECT | PRIORITY (BEFORE UPDATING → AFTER UPDATING) |
| PONTOON DOCK A | 1 → 1 |
| PONTOON DOCK B | 2 → 3 |
| PONTOON DOCK C | 3 → 2 |

| PHOTOGRAPHY RESTRICTION INFORMATION | |
|---|---|
| PREDICTED SATELLITE POSITION | |
| OSCILLATION ANGLE OF SENSOR | |

| WEATHER INFORMATION | |
|---|---|
| ITEM | |
| CLOUD AMOUNT | 13% |
| PRECIPITATION | 5 ml |

FIG. 8F

| OBSERVED OBJECT | PHOTOGRAPHING POSSIBILITY |
|---|---|
| PONTOON DOCK A | ○ |
| PONTOON DOCK B | × |
| PONTOON DOCK C | ○ |

FIG. 8G

| PHOTOGRAPHING PLAN | | | |
|---|---|---|---|
| OBSERVED OBJECT | PRIORITY | PHOTOGRAPHING POSSIBILITY | SHOOT/ NOT SHOOT |
| PONTOON DOCK A | 1 | ○ | ○ |
| PONTOON DOCK B | 3 | × | × |
| PONTOON DOCK C | 2 | ○ | ○ |

| CATEGORY | SIZE | THRESHOLD |
|---|---|---|
| SHIP | LARGE | 20 M OR MORE |
|  | SMALL | LESS THAN 20 M |
| VEHICLE | LARGE | 5 M OR MORE |
|  | SMALL | LESS THAN 5 M |

PHOTOGRAPHING PLAN (INITIAL)

| TIME | 4/25/2013 10:20:00 | 4/25/2013 10:22:00 |
|---|---|---|
| OBJECT A | | |
| OBJECT B | | |
| OBJECT C | | |
| OBJECT D | | |
| ... | | |
| | | |

PHOTOGRAPHING PLAN (AFTER CHANGE)

| TIME | 4/25/2013 10:20:00 | 4/25/2013 10:22:00 |
|---|---|---|
| OBJECT A | | |
| OBJECT B | | |
| OBJECT C | | |
| OBJECT D | | |
| ... | | |
| | | |

FIG. 12

PHOTOGRAPHING PLAN CREATION DEVICE AND PROGRAM AND METHOD FOR THE SAME

CLAIM OF PRIORITY

The present application claims priority from Japanese patent application JP 2013-141525 filed on Jul. 5, 2013, the content of which is hereby incorporated by reference into this application.

BACKGROUND

The present invention relates to a device, program, and method for creating a photographing plan. More particularly, the present invention relates to a device, program, and method for creating a photographing plan to photograph a change in a traveling body or fixed body on the surface of the ground from a flying object.

Patent document 1 (Japanese Patent Application Laid-Open No. 2010-061216) discloses a photographing plan creation system for automatically crating an effective photographing plan by automatically creating a photographing plan for a device for photographing along a predetermined fixed route so that the number of unallocated objects to be photographed is the minimum, to reduce the time for reviewing the unallocated objects to be photographed as well as the time for creating a photographing plan.

SUMMARY

The photographing plan creation system disclosed in Japanese Patent Application Laid-Open No. 2010-061216 does not include the concept of photographing the object to be photographed multiple times with a certain time interval. Thus, it is difficult to extract a changed point from a large number of target points (objects to be monitored).

The present invention provides a device, program, and method for creating a photographing plan by extracting a changed point from target points to preferentially photograph the extracted point.

The above object can be achieved by a photographing plan creation device including: a photographed data reception part for receiving a first photographed data photographed by a flying object; a change determination part for comparing the first photographed data to a second photographed data which is the past photographed data stored in an image data storage part; a photographing possibility determination part for determining whether photography is possible at the scheduled photographing time; a photographing plan creation part for creating a photographing plan based on the determination result of the change determination part as well as the photographing possibility determination; and a photographing plan transmission part for transmitting the photographing plan to the flying object.

Further, the above object can be achieved by a photographing plan creation program for allowing a computer to function as the photographing plan creation device. Also, it can be achieved by a photographing plan creation method in the photographing plan creation device.

According to the present invention, it is possible to provide a device, program, and method for creating a photographing plan by extracting a changed point from target points to preferentially photograph the extracted point.

DETAILED DESCRIPTION

Hereinafter, an embodiment of the present invention will be described in detail with reference to the accompanying drawings.

The configuration of a monitoring system will be described with reference to FIG. 1. Note that in the following example, it is assumed that a satellite is used as a flying object of the monitoring system. However, the flying object includes unmanned aerial vehicle, aircraft, and the like. The flying object has a reception part for receiving a command, a transmission part for transmitting a photographing result, and a camera or sensor capable of changing the photographing range based on the command.

Figure 1:
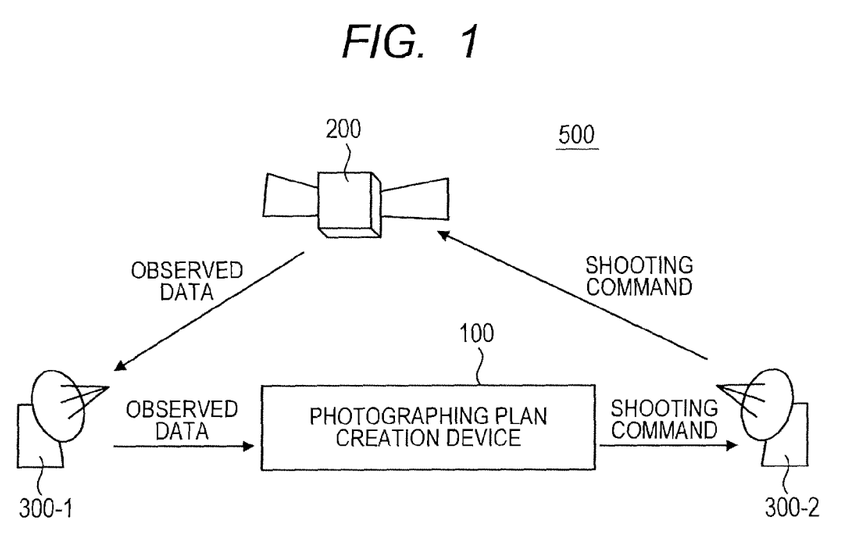
FIG. 1 is a block diagram of a monitoring system of the embodiment.

In FIG. 1, a monitoring system 500 includes a photographing plan creation device 100, a satellite 200, and an antenna 300. The antenna 300 includes a receiving antenna 300-1 and a transmitting antenna 300-2. The antenna 300 can also be a single transmitting-receiving antenna.

The photographing plan creation device 100 creates a photographing plan by inputting observed data received from the satellite 200 for performing observation. The photographing plan creation device 100 transmits a shooting command to the satellite 200 based on the created photographing plan.

Figure 2:
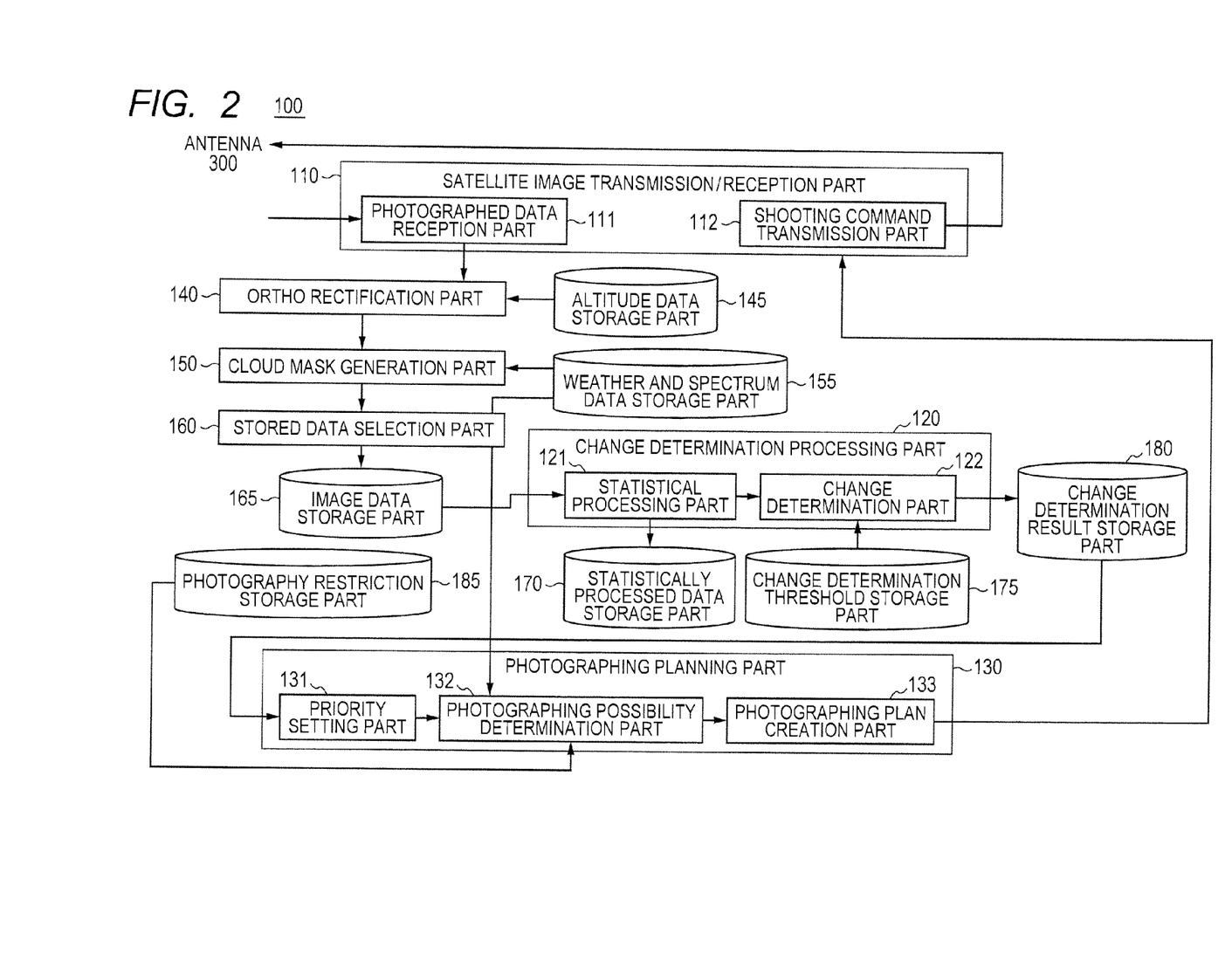
FIG. 2 is a block diagram of a photographing plan creation device of the embodiment.

The configuration of the photographing plan creation device 100 will be described with reference to FIG. 2. In FIG. 2, the photographing plan creation device 100 includes a satellite image transmission/reception part 110, a change determination processing part 120, a photographing planning part 130, an ortho rectification part 140, an altitude data storage part 145, a cloud mask generation part 150, a weather and spectrum data storage part 155, a stored data selection part 160, an image data storage part 165, a statistically processed data storage part 170, a change determination threshold storage part 175, a change determination result storage part 180, and a photography restriction storage part 185.

The satellite image transmission/reception part 110 includes a photographed data reception part 111 and a shooting command transmission part 112. The change determination processing part 120 includes a statistical processing part 121 and a change determination part 122. The photographing planning part 130 includes a priority setting part 131, a photographing possibility determination part 132, and a photographing plan creation part 133.

The photographed data reception part 111 receives the photographed image data from the satellite 200. The shooting command transmission part 112 converts the photographing plan into a command and transmits the command to the satellite 200. The ortho rectification part 140 corrects geometric distortion in the image by inputting altitude data from the altitude data storage part 145. The altitude data storage part 145 stores geometric altitude data.

The cloud mask generation part 150 extracts the part with clouds from the image, and generates a mask to cover the particular part. The stored data selection part 160 selects the effective data with no cloud, and selects the pixel to be stored in the image data storage part 165. The image data storage part 165 maps the effective image data on the latitude/longitude, and stores the mapped data. The image data storage part 165 also stores the past image. The weather and spectrum data storage part 155 stores weather data and spectrum data that are required to generate the cloud mask.

The statistical processing part 121 obtains data from the image data storage part 165 to perform statistical processing. The change determination part 122 determines whether there is a change in the image of the object area by using the statistical processing result.

The change determination result storage part 180 stores the change determination result. The photography restriction storage part 185 stores photography restriction information such as the predicted satellite position and the upper limit of the sensor amplitude angle. The statistically processed data storage part 170 stores the data of the statistical processing result. The change determination threshold storage part 175 stores the threshold for determining the presence of change.

The priority setting part 131 determines the shooting priority from the change determination result. The photographing possibility determination part 132 obtains the photography restriction from the photography restriction storage part 185, to determine whether photography is possible at the scheduled photographing time. The photographing plan creation part 133 creates a photographing plan from the shooting priority and the result of the photographing possibility.

Figure 3A:
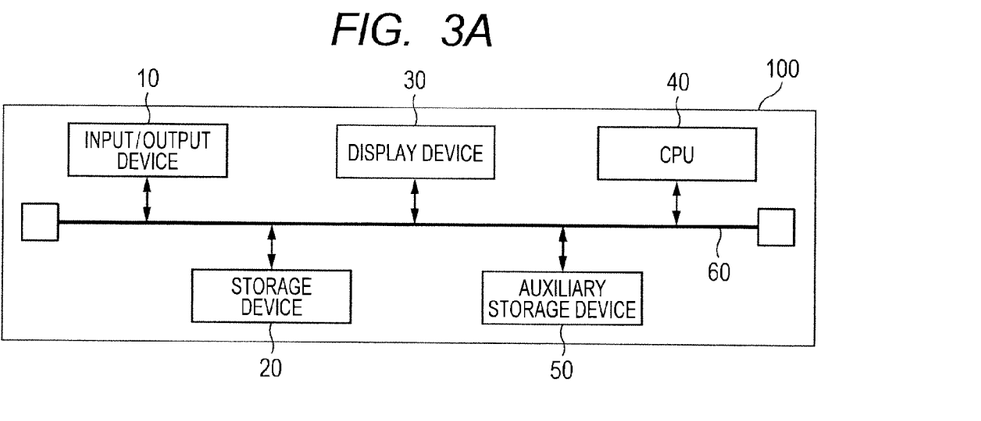
FIGS. 3A, 3B, and 3C are hardware block diagrams of the photographing plan creation device of the embodiment.

The hardware block of the photographing plan creation device will be described with reference to FIGS. 3A, 3B, and 3C. In FIG. 3A, the photographing plan creation device 100 includes an input/output device 10, a storage device 20, a display device 30, a CPU 40, an auxiliary storage device 50, and an internal communication line 60. The internal communication line 60 interconnects the input/output device 10, the storage device 20, the display device 30, the CPU 40, and the auxiliary storage device 50.

Figure 3B:
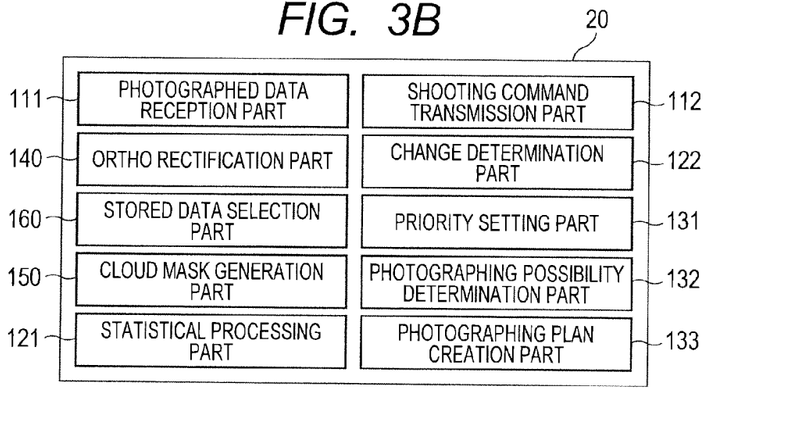

In FIG. 3B, the photographing data reception part 111, the shooting command transmission part 112, the ortho rectification part 140, the change determination part 122, the priority setting part 131, the stored data selection part 160, the cloud mask generation part 150, the photographing possibility determination part 132, the statistical processing part 121, and the photographing plan creation part 133 are realized by the CPU 40 executing a program on the storage device 20.

Figure 3C:
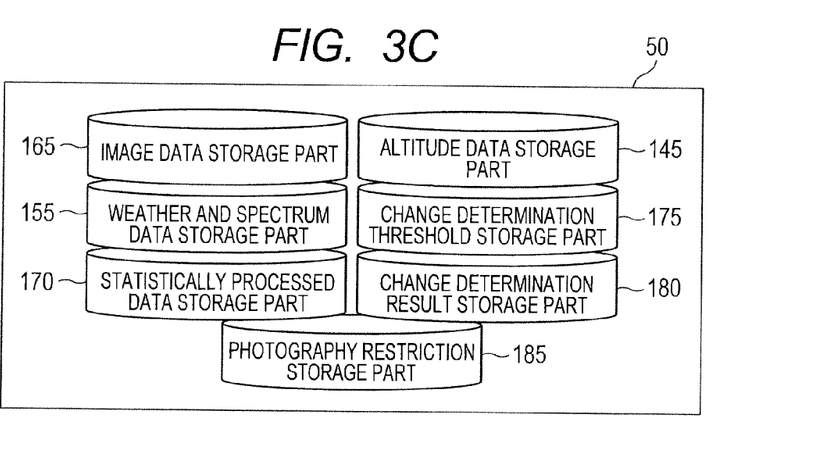

In FIG. 3C, the image data storage part 165, the weather and spectrum data storage part 155, the statistically processed data storage part 170, the altitude data storage part 145, the change determination threshold storage part 175, the change determination result storage part 180, and the photography restriction storage part 185 are placed on the auxiliary storage device.

Figure 4:
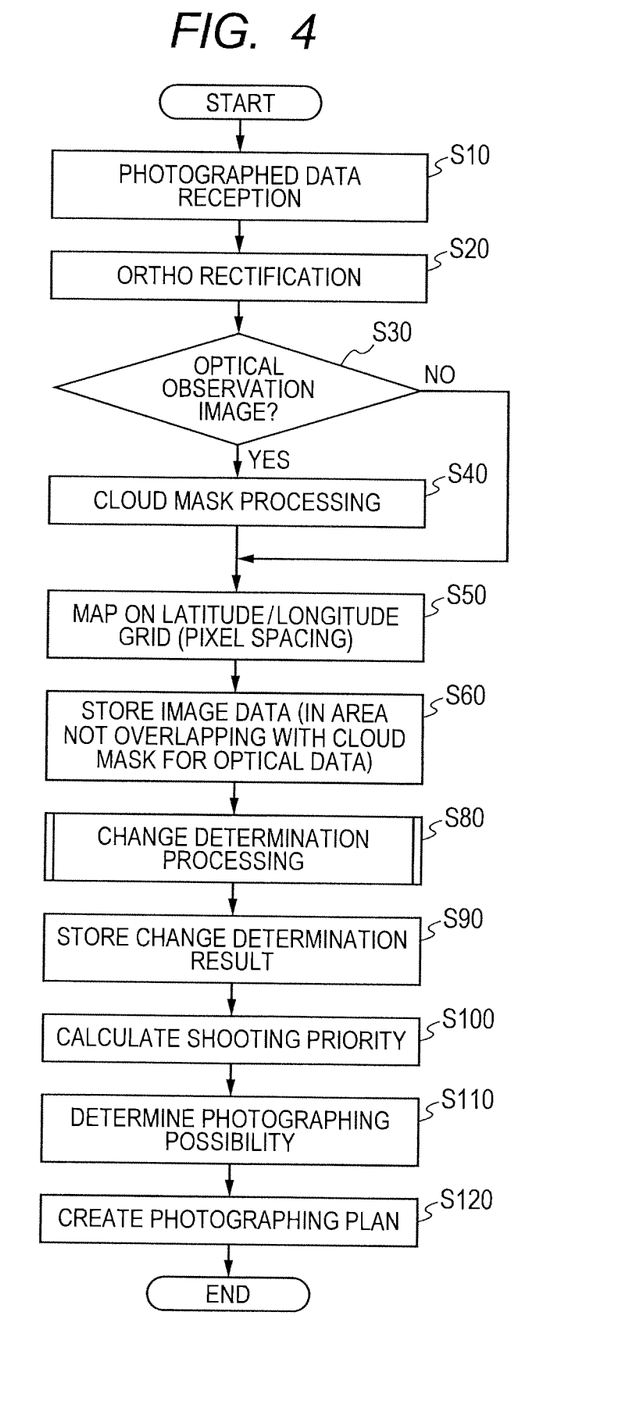
FIG. 4 is a flow chart of the entire photographing plan creation of the embodiment.

The entire process of photographing plan creation will be described with reference to FIG. 4. In FIG. 4, the photographing plan creation device 100 receives optical, radar photographed data (S10). The photographing plan creation device 100 performs ortho rectification (S20). The photographing plan creation device 100 determines whether the data is the optical observation image (S30). If YES, the photographing plan creation device 100 performs cloud mask processing (S40). If NO in step 30, the photographing plan creation device 100 manages the image by assigning latitude and longitude coordinates (S50). The photographing plan creation device 100 stores the image data (S60). The photographing plan creation device 100 performs change determination processing (S80). The photographing plan creation device 100 stores the change determination result (S90). The photographing plan creation device 100 calculates the shooting priority from the change determination result (S100). The photographing plan creation device 10 determines the photographing possibility (S110). The photographing plan creation device 100 creates a photographing plan (S120), and then ends the process.

Figure 5:
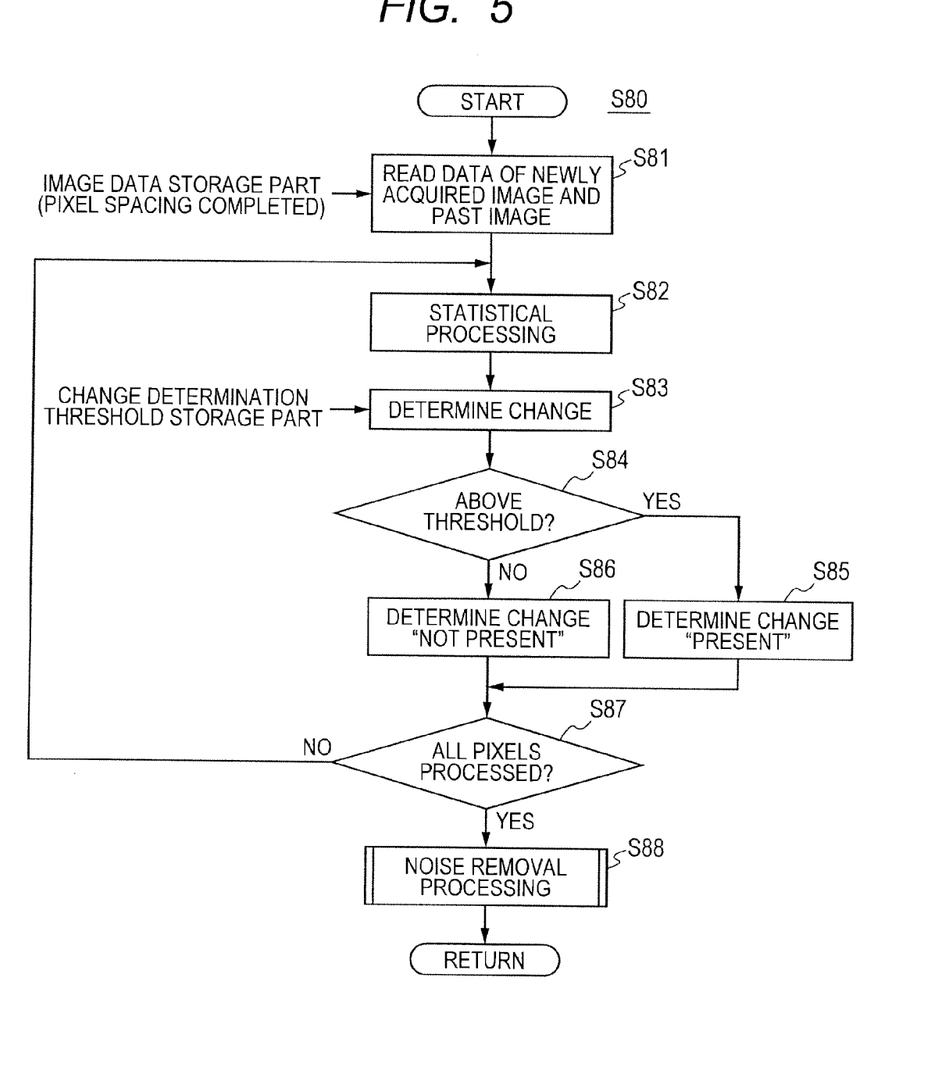
FIG. 5 is a flow chart of the change determination process of the embodiment.

The details of the change determination processing will be described with reference to FIG. 5. In FIG. 5, the change determination part 122 reads the data of newly acquired image and past image stored in the image data storage part 165 (S81). The change determination part 122 performs statistical processing on each image data (S82). The change determination part 122 calculates the difference (amount of difference) between the statistical processing result of the new image and the average of the past statistical processing result (S83). The change determination part 122 determines whether the difference is equal to or more than the threshold (the average statistics for the past 3 periods+10) stored in the change determination threshold storage part (S84). If YES, the change determination part 122 determines the change is "present" (S85). If NO in step 84, the change determination part 122 determines the change is "not present" (S86). After step 85 or step 86, the change determination part 122 determines whether all the pixels in the object area of the image have been processed (S87). If YES, the change determination part 122 removes noise where the change determination is not continuing (S88), and then returns. If NO in step 87, the change determination part 122 proceeds to step 82.

Figure 6:
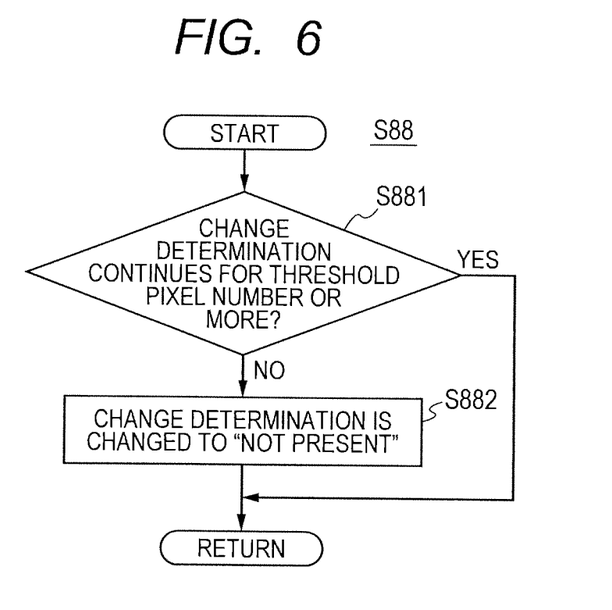
FIG. 6 is a flow chart of the noise removal process of the embodiment.

The noise removal processing will be described with reference to FIG. 6. In FIG. 6, the change determination part 122 determines whether the pixel with "present" in the change determination is continuing for the threshold pixel number or more (S881). Note that the change determination part 122 may be performed this determination in two directions, namely, the travelling direction of the satellite and the direction perpendicular to the travelling direction. This makes it possible to perform noise removal which is hardly influenced by the shape to be photographed. If YES in step 881, the change determination part 122 returns. If NO in step 881, the change determination part 122 changes the change determination of the change determination processing result stored in the change determination result storage part 180, to "not present" (S882). Then, the change determination part 122 returns.

There are two causes of the noise mainly. First is the case of determining change present in the image, although there is no actual change, due to the difference in the photographing conditions (sunshine condition, sensor amplitude angle, and the like) of the image to be photographed. Second is that a fine salt-and-pepper change extraction result is obtained because the specified area unit of the change extraction is smaller than the scale of the object to be photographed. More specifically, a lot of changes in a small boat are obtained although it is desired to find the change in a large ship.

Figure 7A:
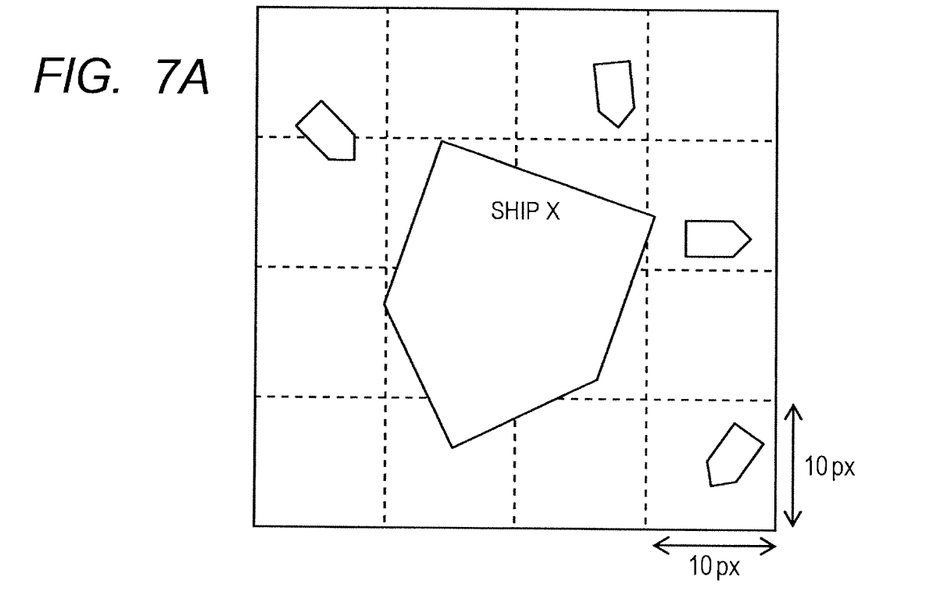
FIGS. 7A and 7B are views showing the area unit and the range specification in the statistical process of the embodiment.

The area unit and the range specification for the statistical processing will be described with reference to FIGS. 7A and 7B. In FIG. 7A, the change determination part 122 performs the statistical processing in mesh units instead of pixel units, by dividing the area into a mesh of pixels, in order to extract the change of an appropriate size in the statistical processing in step 82 in FIG. 5. If it is desired to detect the change in a ship greater than the ship X, it is desirable not to detect the change in a ship smaller than the ship size X. At this time, the area unit (mesh size) for the statistical processing is set to 10 pixels in order to remove the change in the small ship.

Figure 7B:
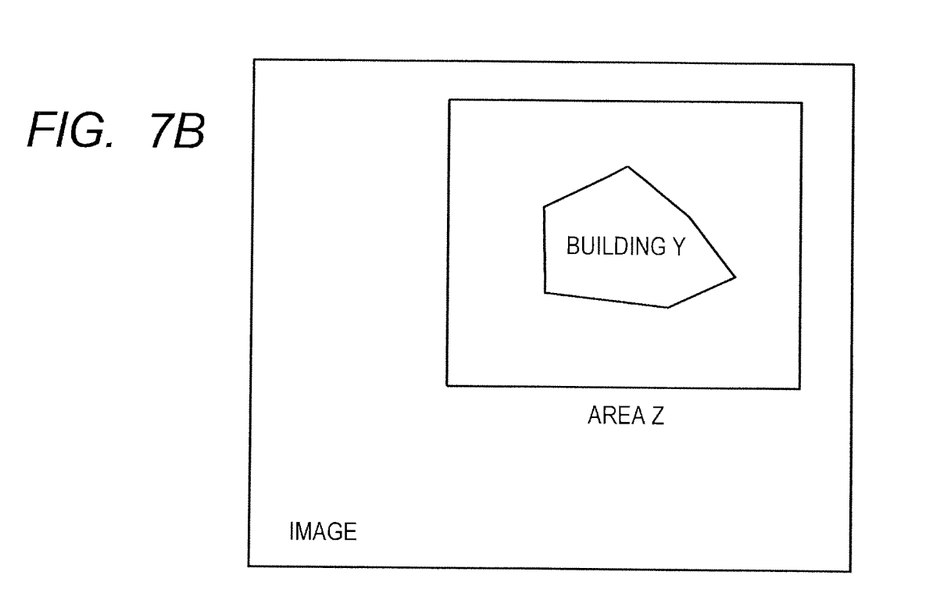

In FIG. 7B, if it is desired to know only the presence of the change in the building Y, the change determination part 122 specifies the range for the statistical processing on the image, such as the area Z, instead of performing the statistical processing on the entire image. Thus, when an image of a large area is obtained, it is possible to obtain the change in only the interested building Y. In addition, the change determination can be performed on the interested portion with high accuracy.

Figure 8A:
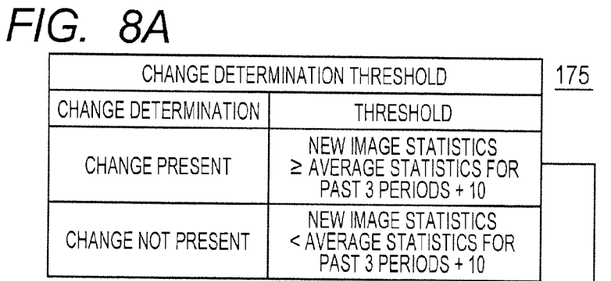
FIGS. 8A to 8G are views of the configuration of tables of the embodiment.
Figure 8B:
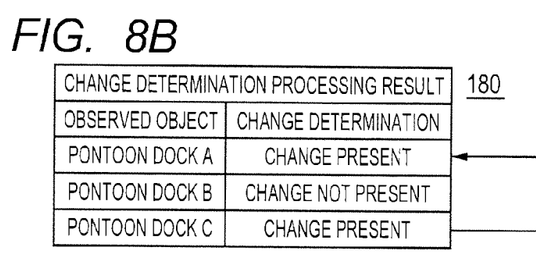
Figure 8C:
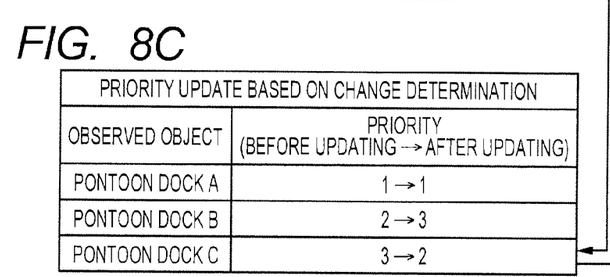
Figure 8D:
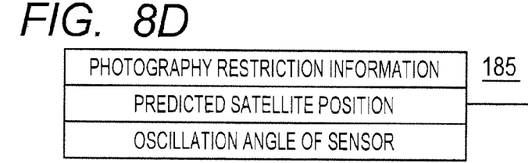
Figure 8E:
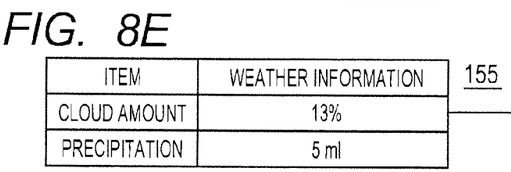
Figure 8F:
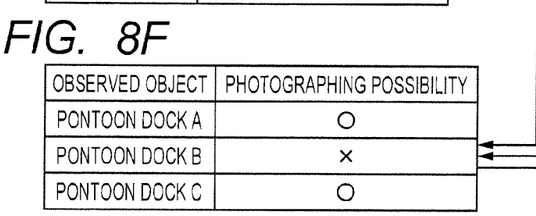
Figure 8G:
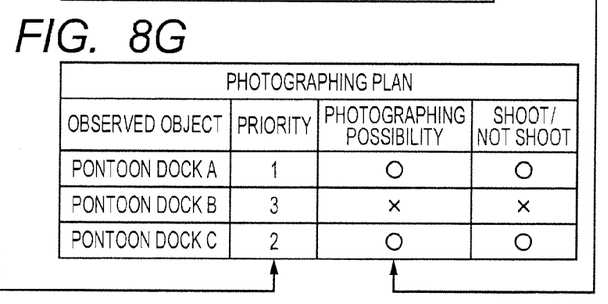

The contents of various tables will be described with reference to FIGS. 8A to 8G. Here, FIG. 8A is a table stored in the change determination threshold storage part 175. FIG. 8B is a table stored in the change determination result storage part 180. FIG. 8C is a view showing the change in the priority based on the change determination. FIG. 8D is a table stored in the photography restriction storage part 185. FIG. 8E is a table stored in the weather and spectrum data storage part 155. FIG. 8F is a view showing the photographing possibility. FIG. 8G is a view showing the photographing plan.

In FIG. 8A, the threshold of the change determination determines change present when the statistics of the image brightness of the new image is equal to or more than the average statistics for the past 3 periods+10.

In FIG. 8B, the change determination processing result stores the observed object and the change determination result.

In FIG. 8C, the priority update based on change determination stores the observed object and the priority (from before updating to after updating). The priority is stored in the priority setting part 131.

In FIG. 8D, the photography restriction information for determining the photographing possibility stores the predicted satellite position as well as the upper limit of the sensor amplitude angle. Here, the sensor amplitude angle is the sensor moving range of angles at right 30 degrees and left 30 degrees in the travelling direction of the satellite.

In FIG. 8E, the weather information is the cloud amount and the precipitation. The cloud amount is the percentage (%) of clouds in the area to be photographed. The precipitation is the amount of precipitation (ml) in the area to be photographed. The weather information covers the image range that can be photographed at the desired photographing time, covering the entire object to be photographed. The weather information may be prepared for each object to be photographed, or may be associated with a piece of weather information together multiple objects to be photographed.

In FIG. 8F, the photographing possibility stores the observed object and the photographing possibility. A circle for the photographing possibility indicates possible, while X indicates not possible.

In FIG. 8G, the photographing plan includes the observed object, the priority, the photographing possibility, and photographing possibility. FIG. 8G is a table that presents again the information of "priority" in FIG. 8C and "photographing possibility" in Fig. F to be able to be compared to "photograph/not photograph".

The change determination is performed in the change determination processing (S80) based on the change determination threshold table 175. The priority setting part 131 updates the priority based on the change determination. At this time, the priority setting part 131 increases the priority for the object with "present" in the change determination, even if the initial priority is low.

The photographing possibility determination part 132 calculates whether the object to be observed can be photographed at the time of the observation, by using the photography restriction information and the weather information in order to determine the photographing possibility. The photographing plan creation part 133 determines whether to photograph or not based on the shooting priority and the photographing possibility. Then, the photographing plan creation part 133 creates a photographing plan.

Figure 9:
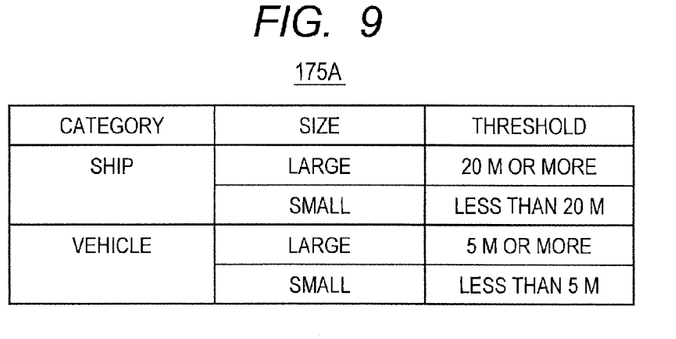
FIG. 9 is a view of a threshold table for each category of the embodiment.

The threshold of each size for each category will be described with reference to FIG. 9. In FIG. 9, the threshold table for each category includes a category and a threshold. In the threshold table for each category, thresholds for different categories are set such as 20 m or more for "large" ship and 5 m or more for "large" vehicle. In this way, it is possible to change the statistical threshold of the change extraction processing.

By specifying the threshold for each category, it is possible to reduce noise of the change determination result. Further, by limiting the desired object for change extraction, it is possible to perform change extraction with high accuracy.

Figure 10:
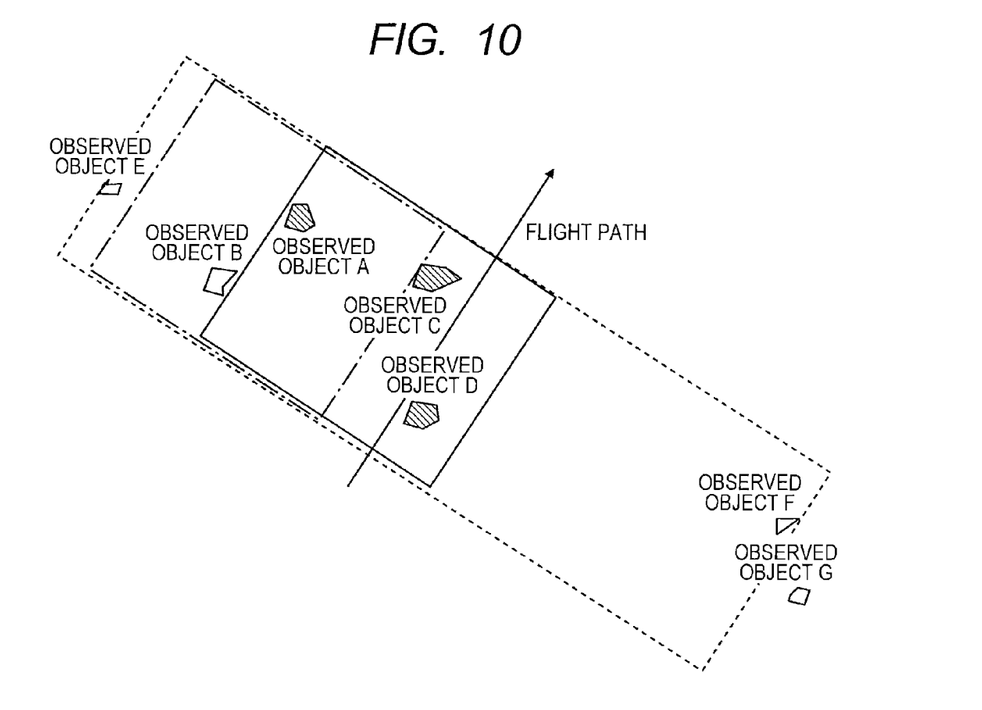
FIG. 10 is a view of an observed object display screen of the embodiment.

Creation of a photographing plan will be described with reference to FIG. 10. In FIG. 10, the area surrounded by a dotted line is the area that is included in the photographable range in the next observation. Interested objects to be observed A to F are present within the area. The initial photographing plan is the area surrounded by a dashed-dotted line. The initial plan is to photograph the predetermined range regardless of whether or not there is a change in the interested area.

Further, as a result of the change determination processing, hatched objects A, C, D are determined to have been changed. The priority setting part 131 updates the shooting priority based on the change determination processing, and thereby increase the priority of the observed objects A, C, and D. Here, as a result of the determination of the photographing possibility from the photography restriction such as the weather information, it is possible to photograph A, C, D all together. The photographing plan creation part 133 creates a photographing plan to photograph the area surrounded by a solid line so that the observed objects A, C, D are photographed all together. Then, the photographing plan creation part 133 transmits the command to the satellite. The satellite receives the command and stores the photographing plan and control information. Then, the satellite photographs the observed objects by changing the direction of the sensor to a predetermined sensor amplitude angle at a predetermined time.

Figure 11:
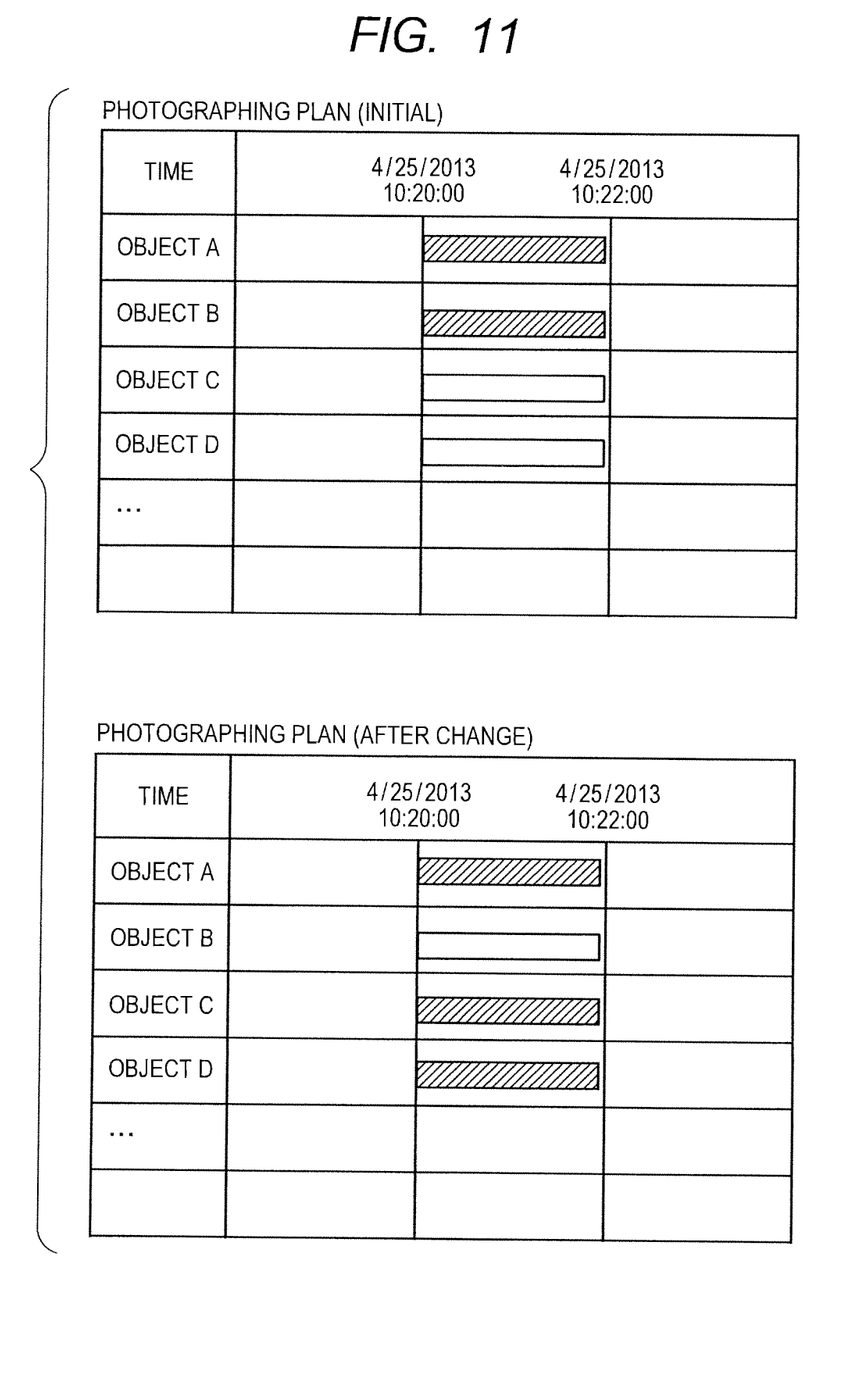
FIG. 11 is a view of a photographing plan before and after the change of the embodiment.

The schedule generation screen will be described with reference to FIG. 11. In FIG. 11, the upper part shows the initial photographing plan, and the lower part shows the photographing plan to which the following example is applied. Note that the hatched part is the hours for photography. In the initial photographing plan, the observed objects A and B were scheduled to be photographed. However, the photographing plan is created to photograph the observed objects A, C, D. Thus, the schedule screen displays the schedule to photograph A, C, D. In this case, the priority increases as a result of change in A, C, D, so that the photographing plan is changed.

Figure 12:
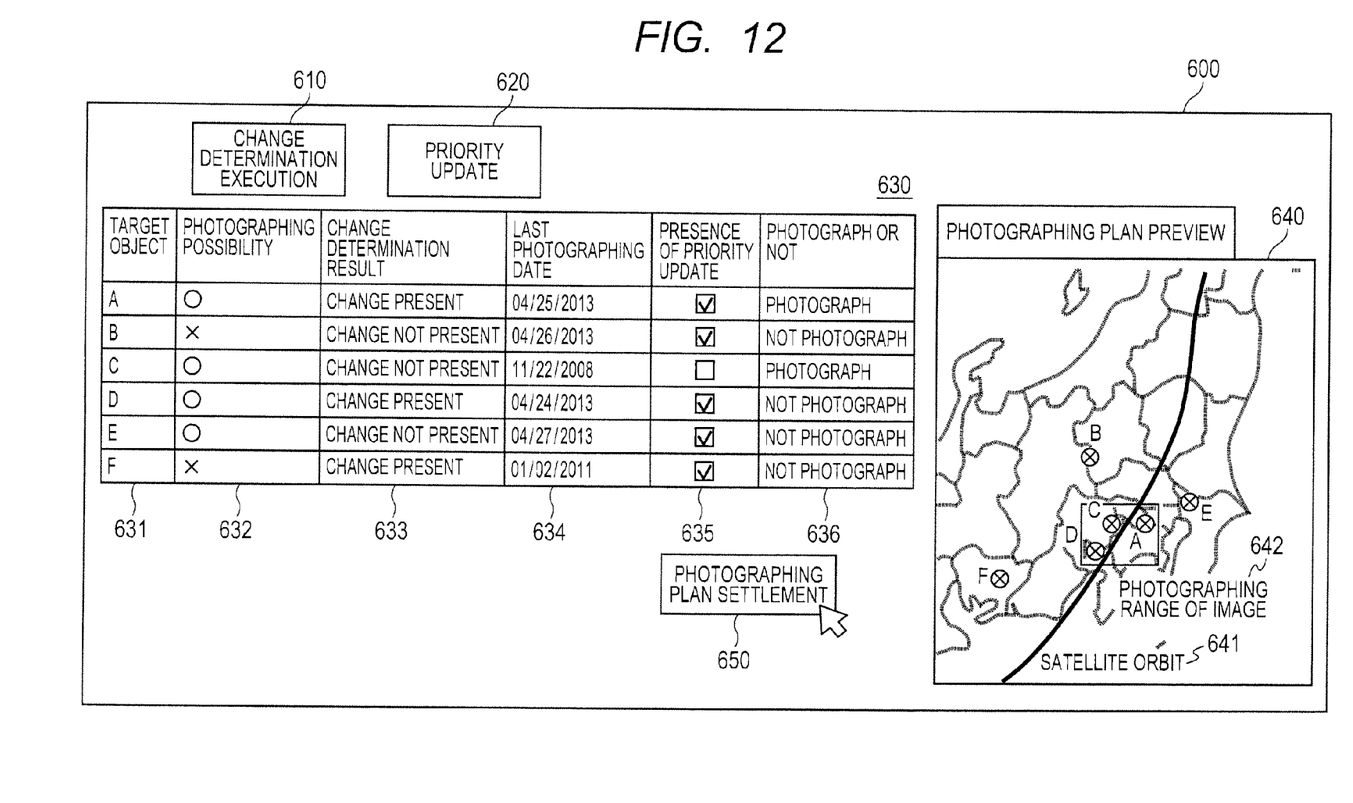
FIG. 12 is a view of an input screen of the photographing plan creation device of the embodiment.

The input screen of the photographing plan creation device will be described with reference to FIG. 12. In FIG. 12, an input screen 600 includes "CHANGE DETERMINATION EXECUTION" button 610, "PRIORITY UPDATE" button 620, object setting table 630, photographing plan preview 640, and "PHOTOGRAPHING PLAN SETTLEMENT" button 650. Further, an object setting table 630 includes target object 631, photographing possibility 632, change determination result 633, last photographing date 634, presence of priority update 635, and photograph or not 363. According to the input screen 600, it is possible to select whether to update the priority by the check box of the presence of priority update 635 in response to the change determination result.

When the "PRIORITY UPDATE" button 620 is pressed, the priority is updated based on the change determination result. Then, the photographing range of the next image to be photographed is calculated so that the object target with high priority is photographed based on the updated priority. Then, the object target, the satellite orbit 641 for the next photography, and the image photographing range 642 are displayed in the photographing plan preview 640.

If the displayed order of the objects to be photographed is correct, the photographing plan of the image is determined by pressing the "PHOTOGRAPHING PLAN SETTLEMENT" button 650. If it is desired to change the photographing range, the photographing range should be recalculated by changing the conditions.

Figure 13:
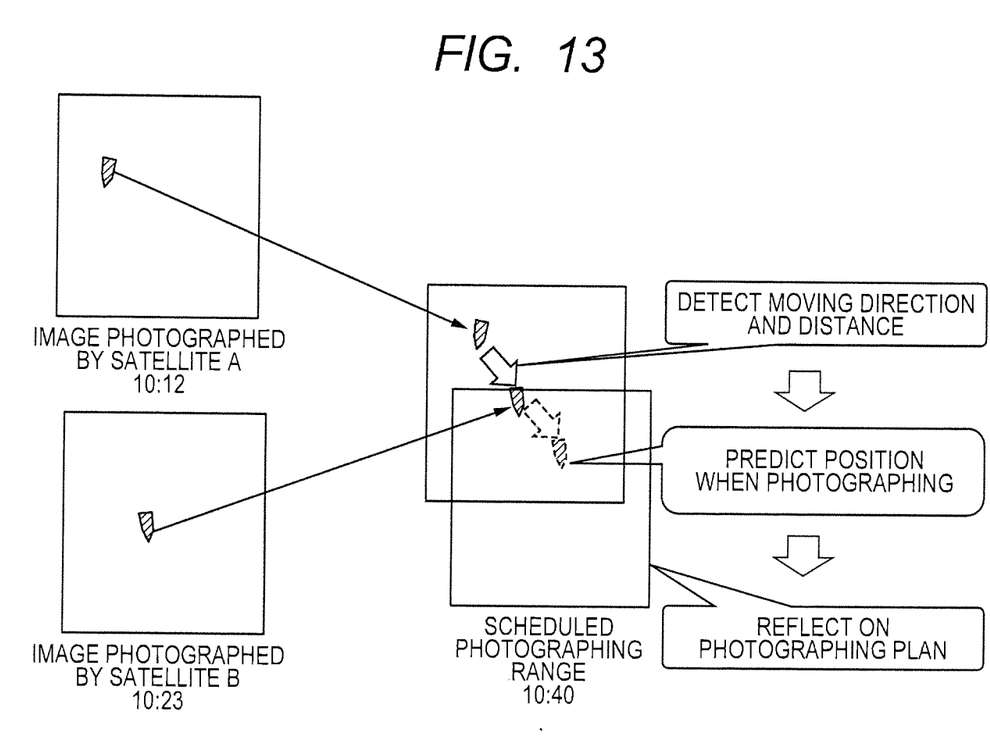
FIG. 13 is a view showing photographing plan creation to link multiple satellites together of the embodiment.

The photographing plan to link multiple satellites together will be described with reference to FIG. 13. In FIG. 13, the upper left part is the photographed image photographed by the satellite A at 10:12. The lower left part is the photographed image photographed by the satellite B at 10:23. Note that the square photographing regions are the same.

On the right side of FIG. 13, the photographic image of the satellite A and the photographic image of the satellite B are synthesized. As a result of the synthesis, the moving direction and the moving distance can be calculated.

The position of the target object, which will be next photographed at 10:40, is predicted by using multiple satellite photographic images, and by adding a position prediction part for predicting the future position from the position change in images of 2 or more periods. Thus, it is possible to create a photographing plan to photograph the image in which the predicted position is included.

Figure 14:
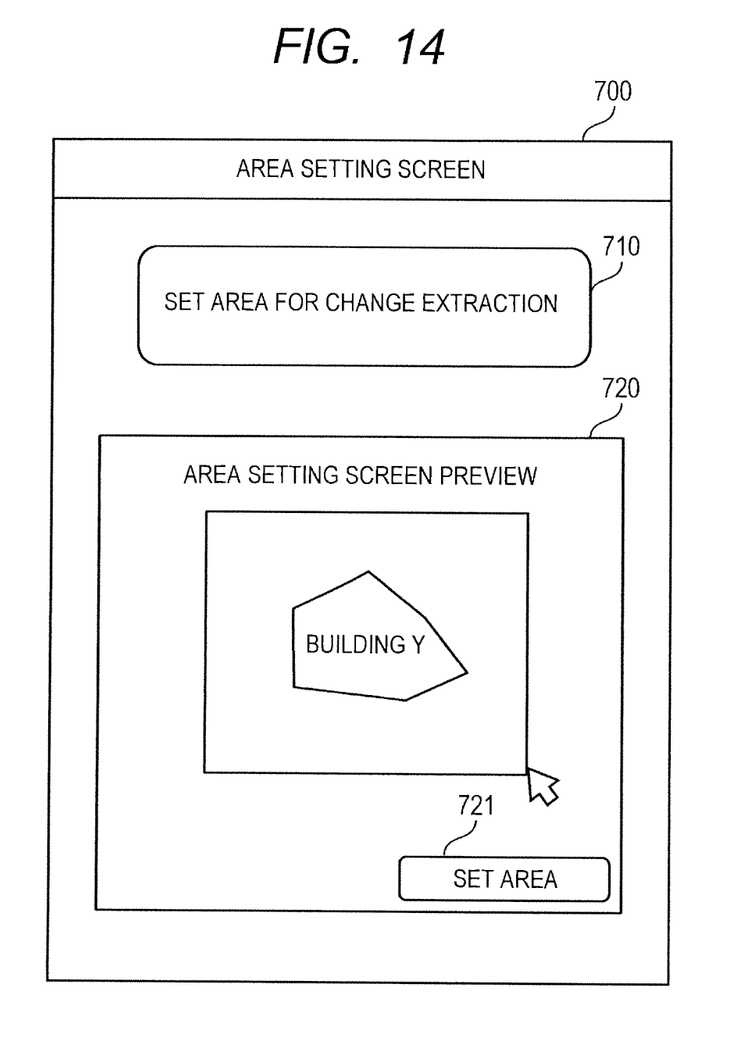
FIG. 14 is a view of an input screen for specifying the change determination process of the embodiment.

The area setting screen will be described with reference to FIG. 14. In FIG. 14, an area setting screen 700 is the setting screen shown in FIG. 7B. The area setting screen 700 includes a display part 710 of "SET AREA FOR CHANGE EXTRACTION", and an area setting screen preview 720. The area setting screen preview 720 includes "SET AREA" button 721. With the area setting screen 700, it is possible to set the area for change determination processing while seeing the preview image on the screen.

According to the present embodiment, it is possible to provide a device, program, and method for creating a photographing plan by extracting a changed point from target points to preferentially photograph the extracted point.

Further, it is possible to change the threshold with a change for each category. It is also possible to narrow the range to be photographed.

What is claimed is:

1. A photographing plan creation device comprising:
   a photographed data reception part for receiving a first photographed data photographed by a flying object;
   a change determination part for comparing the first photographed data to a second photographed data which is the past photographed data stored in an image data storage part;
   a photographing possibility determination part for determining whether photography is possible at the scheduled photographing time based on at least one of: a predicted flying object position, a sensor angle limit, and weather information;
   a photographing plan creation part for creating a photographing plan based on the determination result of the change determination part as well as the photographing possibility determination; and
   a photographing plan transmission part for transmitting the photographing plan to the flying object.

2. A photographing plan creation device according to claim 1, wherein the change determination part can change the comparison accuracy per pixel.

3. A photographing plan creation device according to claim 2, wherein the change determination part compares the change in a predetermined range of photographed data.

4. A photographing plan creation device according to claim 3, wherein the change determination part performs cloud mask processing when the first photographed data is the optical observation image.

5. A photographing plan creation device according to claim 2, wherein the change determination part performs cloud mask processing when the first photographed data is the optical observation image.

6. A photographing plan creation device according to claim 1, wherein the change determination part compares the change in a predetermined range of photographed data.

7. A photographing plan creation device according to claim 6, wherein the change determination part performs cloud mask processing when the first photographed data is the optical observation image.

8. A photographing plan creation device according to claim 1, wherein the change determination part performs cloud mask processing when the first photographed data is the optical observation image.

9. The photographing plan creation device of claim 1, wherein the photographing plan creation part for creating a photographing plan based on the determination result of the change determination part as well as the photographing possibility part is configured to create a photographing plan that includes photographing a highest priority target, the priority of the target determined at least in part based on the determination result.

10. A photographing plan creation method comprising the steps of:
    receiving a first photographed data photographed by a flying object;

comparing the first photographed data to a second photographed data which is the past photographed data;

determining the photographing possibility at the observation time based on at least one of: a predicted flying object position, a sensor angle limit, and weather information;

creating a photographing plan based on the comparison result and the determination result; and transmitting the photographing plan to the flying object.

11. A photographing plan creation method according to claim 10, wherein the comparative accuracy can be changed per pixel in the comparing step.

12. A photographing plan creation method according to claim 11, wherein the change in the predetermined range of photographed data is compared in the comparing step.

13. A photographing plan creation method according to claim 12, further comprising a step of performing cloud mask processing when the first photographed data is the optical observation image.

14. A photographing plan creation method according to claim 11, further comprising a step of performing cloud mask processing when the first photographed data is the optical observation image.

15. A photographing plan creation method according to claim 10, wherein the change in the predetermined range of photographed data is compared in the comparing step.

16. A photographing plan creation method according to claim 15, further comprising a step of performing cloud mask processing when the first photographed data is the optical observation image.

17. A photographing plan creation method according to claim 10, further comprising a step of performing cloud mask processing when the first photographed data is the optical observation image.

18. The photographing plan creation method of claim 10, wherein the creating a photographing plan based on the comparison result and the determination result includes creating a photographing plan that includes photographing a highest priority target, the priority of the target determined at least in part based on the determination result.

19. A photographing plan creation program embedded in a non-transitory computer-readable medium allowing a computer to function as:

a photographed data reception part for receiving a first photographed data photographed by a flying object;

a change determination part for comparing the first photographed data to a second photographed data which is the past photographed data stored in an image data storage part;

a photographing possibility determination part for determining whether photography is possible at the observation time based on at least one of: a predicted flying object position, a sensor angle limit, and weather information;

a photographing plan creation part for creating a photographing plan based on the determination result of the change determination part as well as the photographing possibility determination; and a photographing plan transmission part for transmitting the photographing plan to the flying object.

20. The photographing plan creation program embedded in a non-transitory computer-readable medium of claim 19, wherein the photographing plan creation program further allows the computer to function as:

a photographing plan creation part for creating a photographing plan based on the determination result of the change determination part as well as the photographing possibility part is configured to create a photographing plan that includes photographing a highest priority target, the priority of the target determined at least in part based on the determination result.

* * * * *